Dec. 26, 1944.  J. W. CLERKE  2,365,804
CONTINUOUS PRESS
Filed May 14, 1940  7 Sheets-Sheet 1

INVENTOR
John W. Clerke
BY
his ATTORNEY

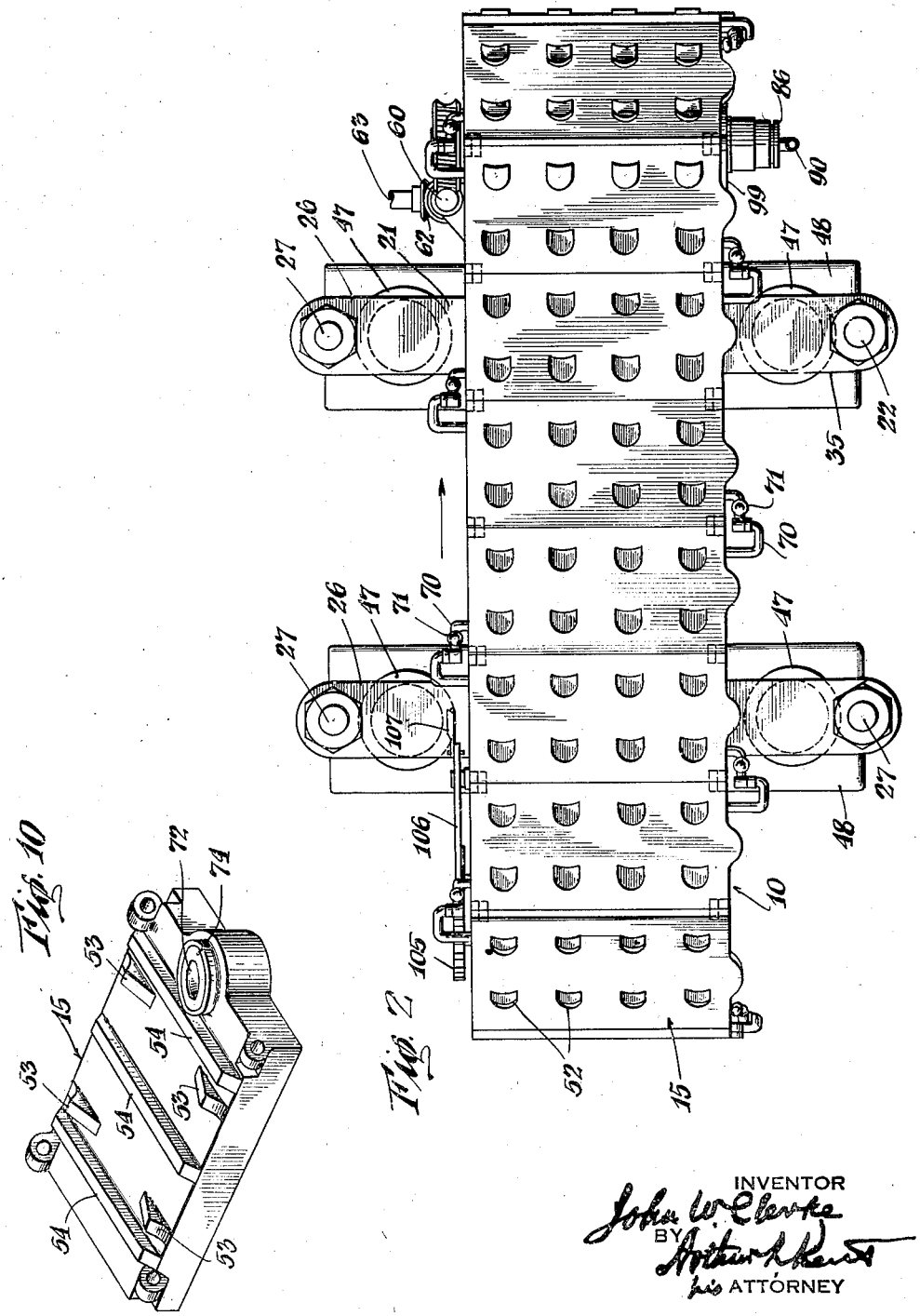

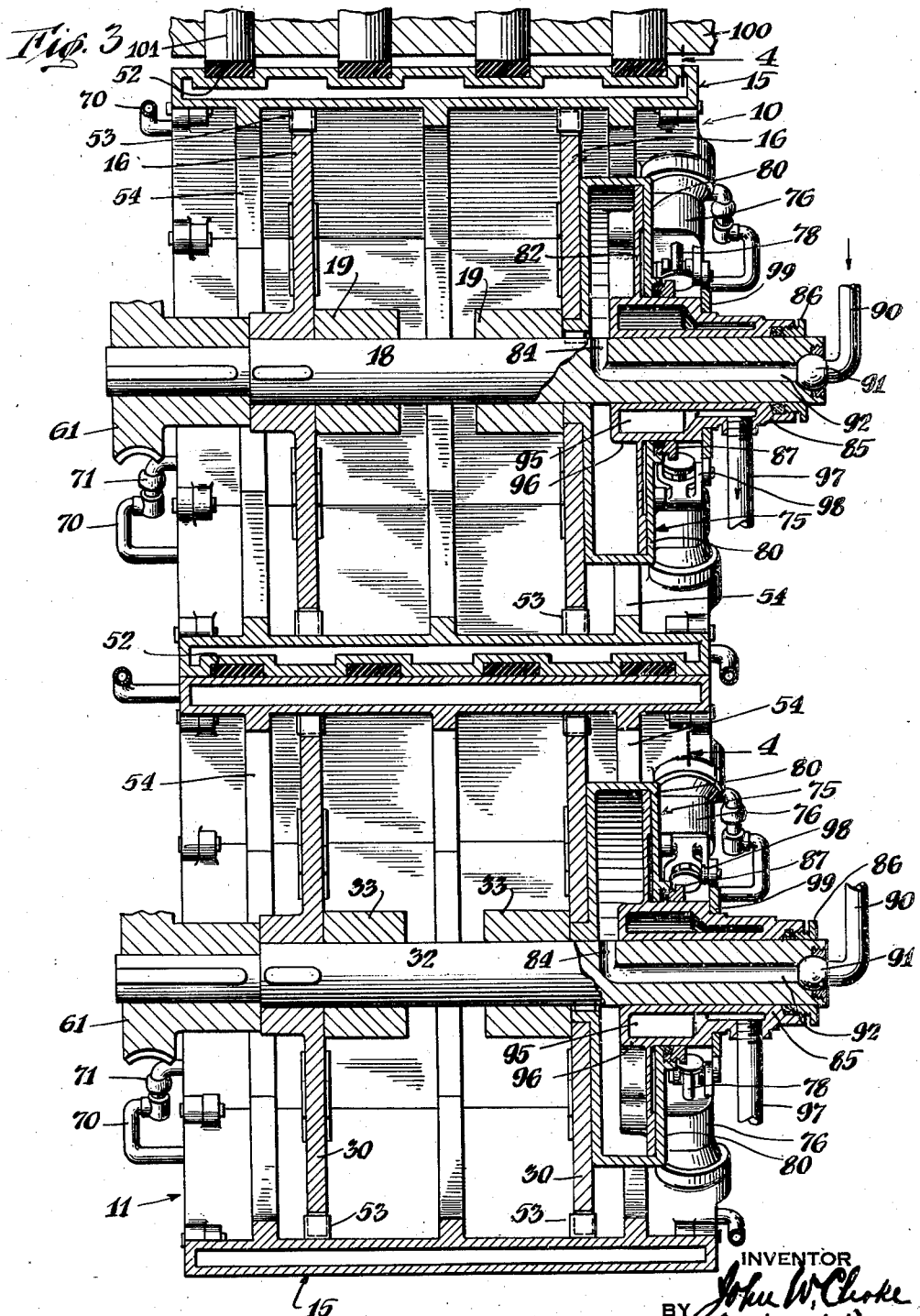

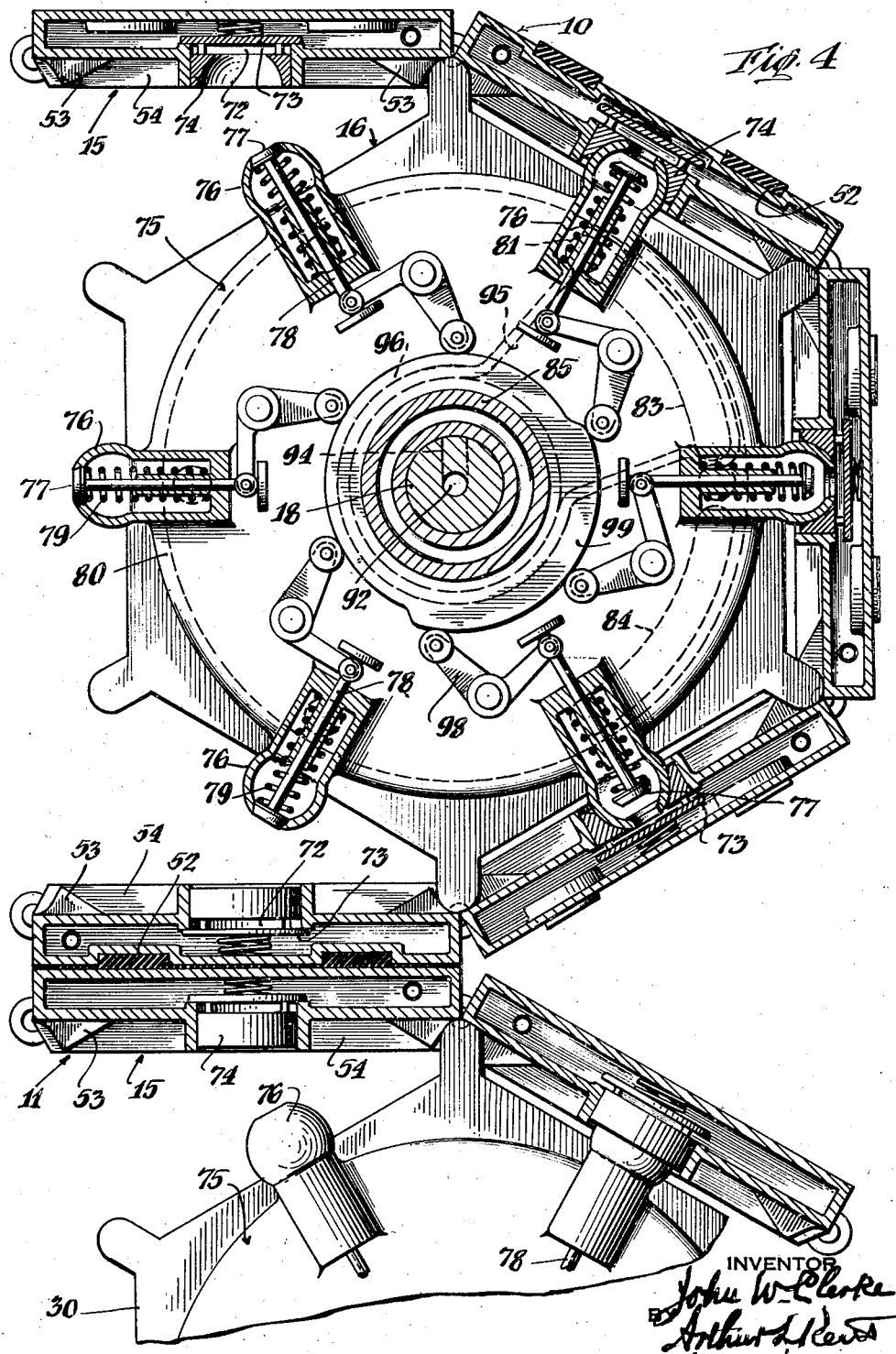

Dec. 26, 1944.  J. W. CLERKE  2,365,804
CONTINUOUS PRESS
Filed May 14, 1940  7 Sheets-Sheet 5
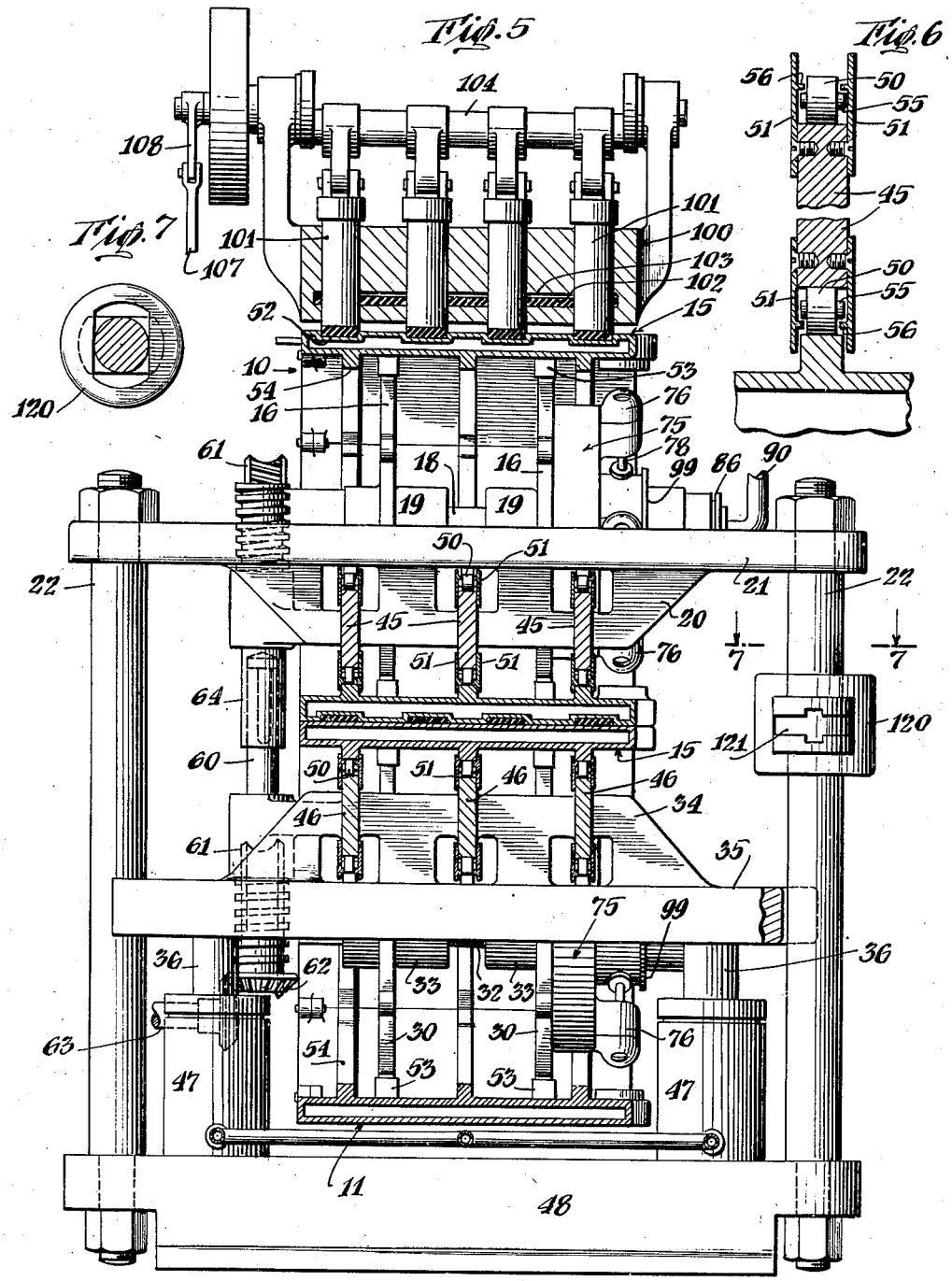
INVENTOR
John W. Clerke
BY
his ATTORNEY

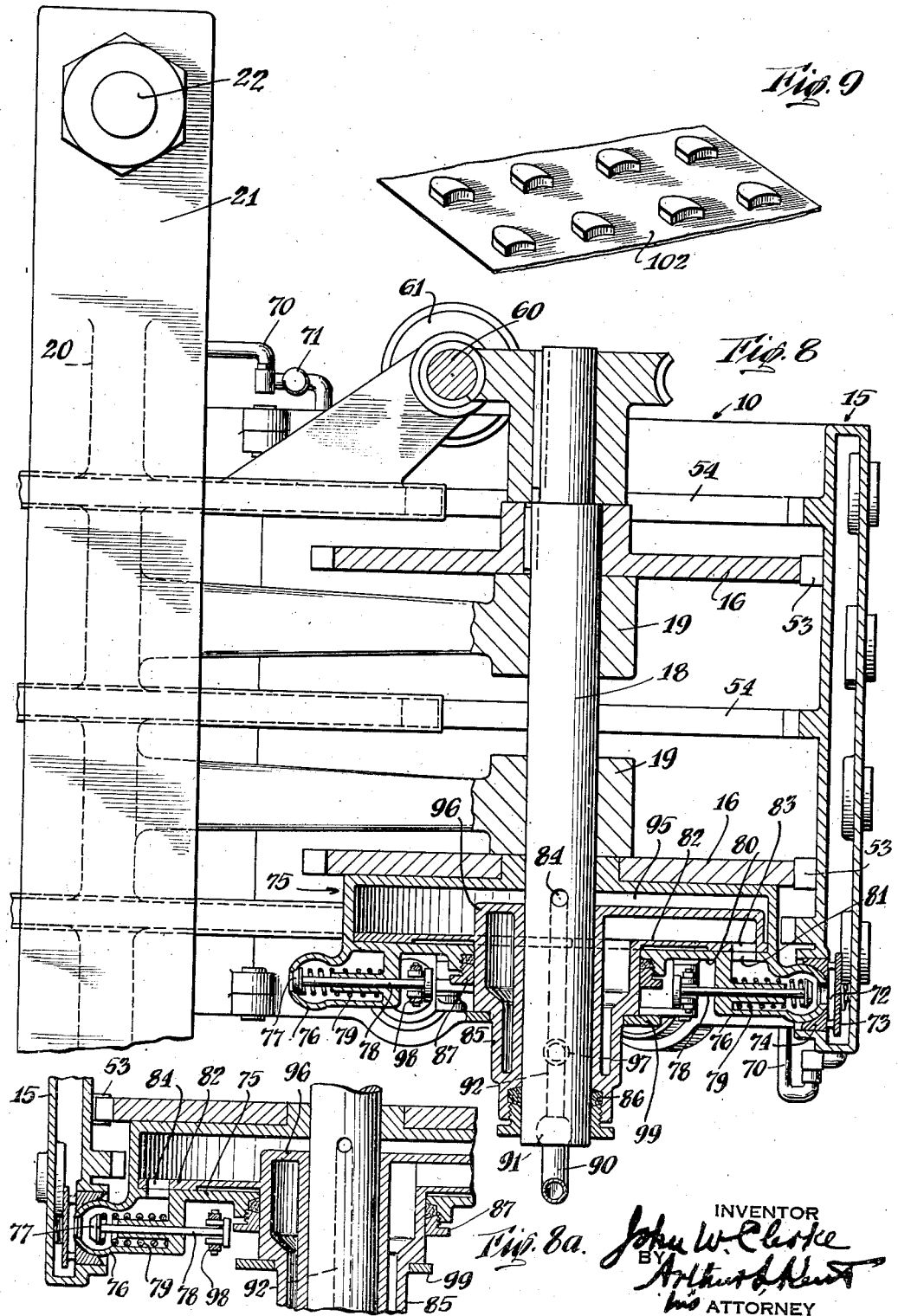

Dec. 26, 1944.   J. W. CLERKE   2,365,804
CONTINUOUS PRESS
Filed May 14, 1940   7 Sheets-Sheet 7
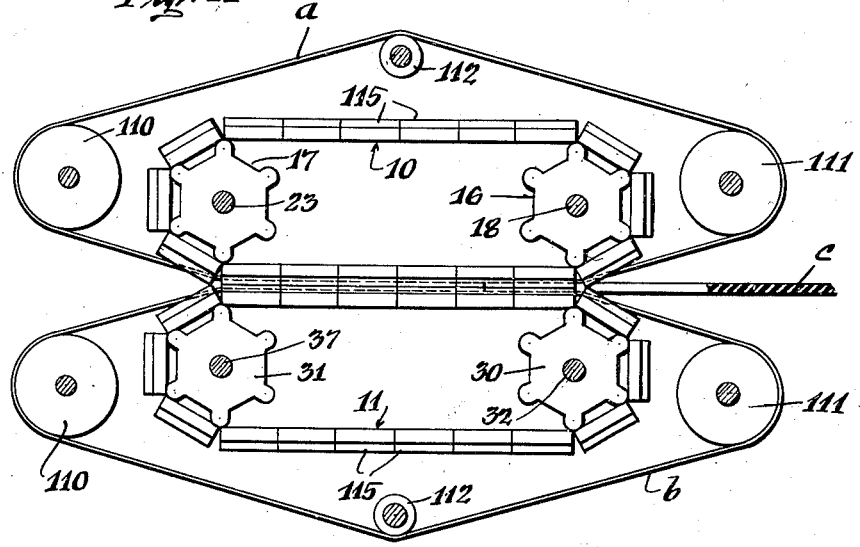
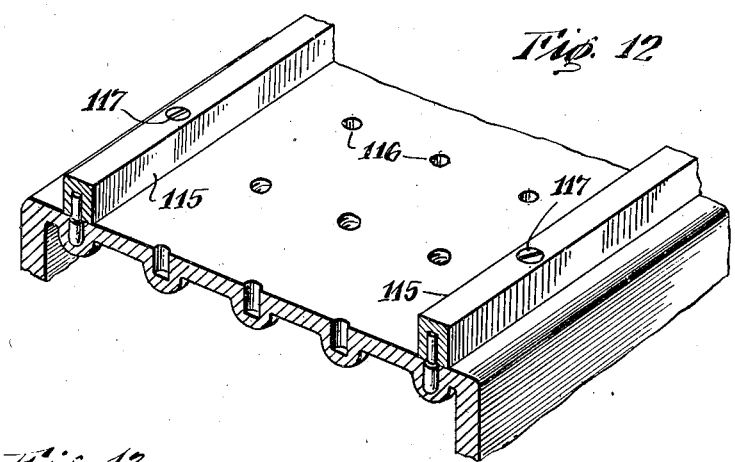
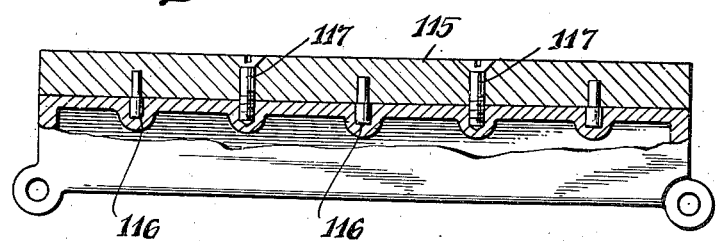
INVENTOR
John W. Clerke
BY
Arthur L. Reast
ATTORNEY Patented Dec. 26, 1944

2,365,804

UNITED STATES PATENT OFFICE 2,365,804

CONTINUOUS PRESS

John W. Clerke, Bellaire, N. Y.

Application May 14, 1940, Serial No. 335,035

20 Claims. (Cl. 18—21)

This invention relates to continuous presses, and more especially to machines for molding rubber compounds and other plastic material of the type commonly known as continuous molding presses. Machines according to the invention are intended more especially for molding rubber compounds and other plastics which require to be subjected to heat during and following the initial molding operation, and the invention relates in part to means for heating moving platen sections between which the material is molded, or, as it might be, merely pressed. The invention has been made with the idea of providing an improved machine for molding separate comparatively small articles, such, for examples, as rubber shoe heels and shoe soles and buttons, but machines embodying the main features of the invention may be adapted, also, for molding and curing or merely pressing material in long lengths which cannot be satisfactorily handled by the step by step method in presses the platens of which do not move longitudinally.

Machines according to the invention are of the type having two endless chains made up of platen sections hingedly connected and mounted and driven one above the other with the lower, or working, run of the upper chain and the upper, or working, run of the lower chain moving in the same direction in parallel planes and at the same speed in coacting relation, providing continuous platen or mold surfaces between which the material is pressed.

The invention aims to provide an improved machine of this kind, and its main features are an improved pressure means whereby the platen sections of the working runs of the two platen chains are pressed toward each other with uniform spacing of the coacting platen sections and with uniform pressure throughout the whole extent of the working runs of the platen chains irrespective of the width of the chains and the length of the working runs, and an improved heating means, or, as it might be, other temperature-controlling means, whereby heating fluid, or other temperature-controlling fluid, either liquid or gaseous, is supplied to the platen sections, the sections being hollow, before they come together at the beginning of the working runs of the chains and is discharged therefrom before they again come to the place of supply, the platen sections having most desirably fluid-flow connections between the adjacent sections of each chain so that flow of the heating fluid is obtained from the place of supply to the place of discharge. Suitable mold plates carrying material to be molded may be fed between the cooperating platen sections as the sections from the upper and lower chains approach each other at the beginning of their working run, or the working faces of the platen sections of the upper or lower chain or both may be made with mold cavities so that the platen sections serve directly as mold sections.

Other objects of the invention and the features of construction and arrangement of parts whereby the objects of the invention are attained will appear from the detailed description of an illustrative machine for molding rubber heels embodying the various features of the invention in the form now considered best, and such a description will now be given in connection with the accompanying drawings, in which:

Fig. 2 is a plan view of the machine shown in Fig. 1;

Fig. 3 is a section taken on line 3—3 of Fig. 1 on a larger scale looking in the direction of the arrows;

Fig. 4 is a sectional view taken on line 4—4 of Fig. 3 looking in the direction of the arrows;

Fig. 5 is a sectional view taken on line 5—5 of Fig. 1 looking in the direction of the arrows;

Fig. 6 is a detail sectional view taken on line 6—6 of Fig. 1 looking in the direction of the arrows;

Fig. 7 is a detail sectional view taken on line 7—7 of Fig. 5 looking in the direction of the arrows;

Fig. 8 is a sectional view taken on line 8—8 of Fig. 1 looking in the direction of the arrows;

Fig. 8a is a sectional view taken on line 8a—8a of Fig. 1 looking in the direction of the arrows;

Fig. 9 shows a piece of a product of the machine as it comes from the machine;

Fig. 10 is a perspective view of the back side of one of the platen sections;

Fig. 11 is a side view illustrating a way of using the machine for molding or merely pressing continuous strip material;

Fig. 12 is a fragmentary sectional perspective view of one of the platen sections of the machine as shown in Fig. 11 on a larger scale; and Fig. 13 is a longitudinal edge view partly in section of one of said platen sections.

Figure 1:
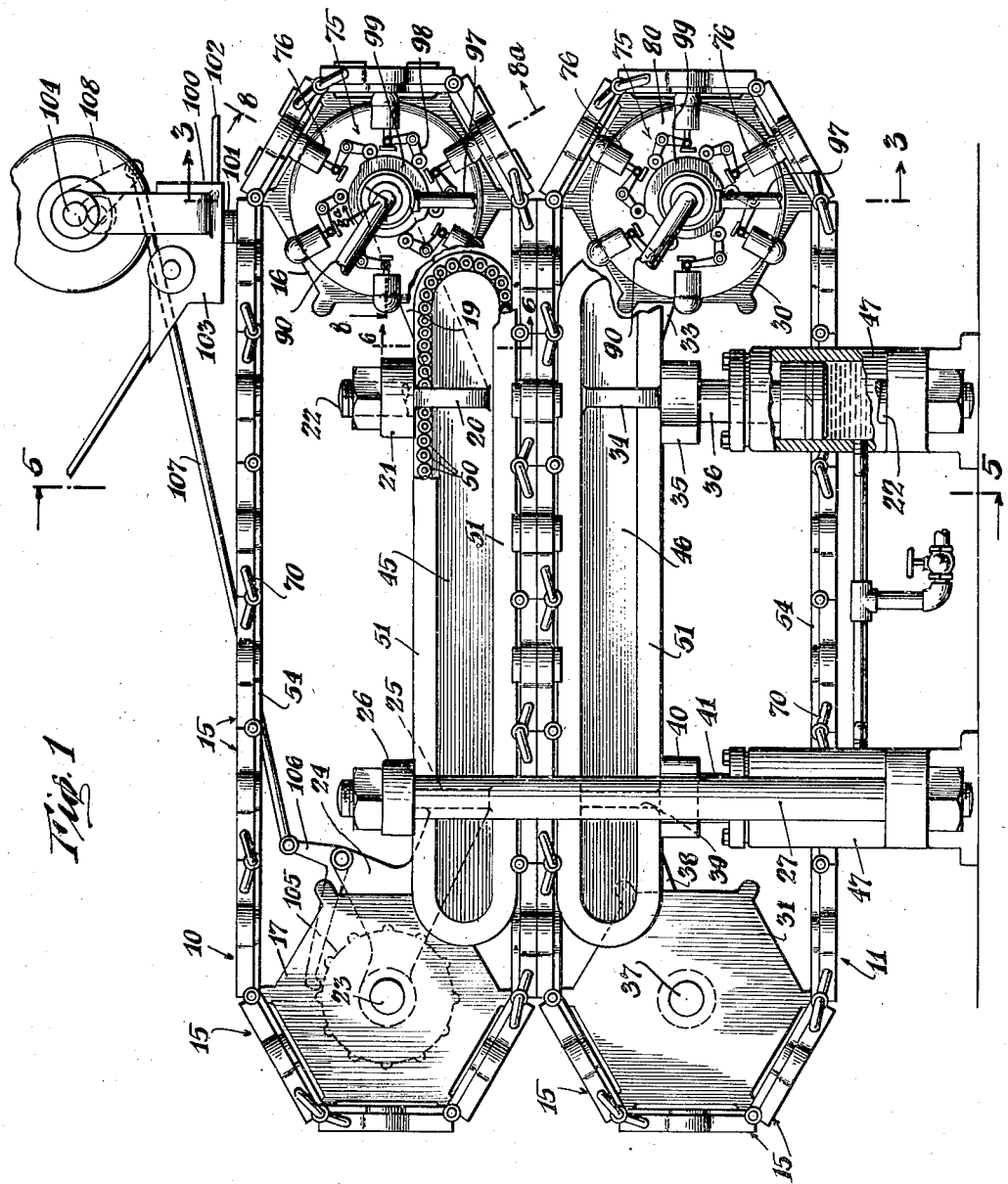
Fig. 1 is a side view of such a machine with parts in section.

Referring to the drawings, the machine comprises as its principal elements two endless chains 10 and 11 each made up of a plurality of flat rectangular platen sections 15 hinged together so that the adjacent edges of sections extending in a plane will meet together to form a flat platen surface extending the length of the platens lying in the plane. The upper chain of platen sections is mounted on two horizontally spaced sprocket structures 16 and 17 each made up of two axially spaced sprocket discs. The two sprocket discs 16 at the front, or entrance, end of the machine are mounted on and keyed to a cross-shaft 18 journaled in brackets 19 extending from a cross-plate 20 which extends downward from a cross-bar 21 mounted at its ends on standards 22; and the two sprocket discs 17 at the rear end of the machine are mounted on a cross-shaft 23 carried by brackets 24, one of which appears in Fig. 1, extending from a cross-plate 25 indicated by dotted lines in Fig. 1 which extends downward from a cross-bar 26 mounted at its ends on standards 27. The lower chain is similarly mounted on two horizontally spaced sprocket structures 30 and 31 each made up of two axially spaced sprocket discs. The two sprocket discs 30 are mounted on and keyed to a cross-shaft 32 journaled in brackets 33 extending from a cross-plate 34 which extends upward from a cross-bar 35 mounted at its ends on standards 36, and the two sprocket discs 31 are mounted on a cross-shaft 37 carried by brackets 38, a part of one of which appears in Fig. 1, extending from a cross-plate 39, indicated by dotted lines in Fig. 1, and which is similar to the cross-plate 34 extending upward from a cross-bar 40 mounted at its ends on standards 41.

The cross-plates 20 and 25 are rigidly connected by three vertically standing and longitudinally extending plates 45, thus making a rigid structure of the cross-bars 21 and 26 with their plates 20 and 25 and the longitudinal plates 45, which structure is supported by the standards 22 and 27. Similarly, the upwardly extending cross-plates 34 and 39 are rigidly connected by three vertically standing longitudinally extending plates 46 to make a rigid structure of the cross-bars 35 and 40, cross-plates 34 and 39, and longitudinal plates 46, and this rigid structure is supported by the standards 36 and 41.

The sprocket-carrying shafts are so located that the platen sections in the upper run of the lower chain and those in the lower run of the upper chain will move in cooperative relation with each other, and most desirably in horizontal planes. The upper frame structure formed by the cross-bars 21 and 26 and associated parts is supported in fixed position by the standards 22 and 27. The lower frame structure is adjustably supported to provide relative vertical adjustment between the working runs of the two platen belts. As shown, and most desirably, to provide for this vertical adjustment of the lower chain-carrying frame, the frame-supporting standards 36 and 41 extend upward from hydraulic jacks 47 one for each standard and all connected to a common manifold so that the lifting force applied to the lower frame structure is uniform at all points of its horizontal extent. The working run of the lower platen chain may thus be adjusted vertically toward and from the lower run of the upper chain as required according to the manner in which the machine is being used and to furnish the necessary pressure required to form and squeeze the material or articles being molded. The hydraulic rams are mounted on, and the standards 22 and 27 extend upward from, base castings 48 mounted on any suitable foundation structure.

In continuous molding machines of this type, it is necessary to provide pressure means for pressing the platen sections in the working runs of the two chains toward each other so that a desired uniform pressure shall be applied to the material being molded throughout the length of the working runs. It has been found difficult heretofore to provide suitable means for so pressing the platens together with uniform spacing of the coacting platen sections and with uniform pressure throughout the whole extent of the working runs of the chains without creating great frictional resistance, and this has been especially so when the platen sections have been of considerable width.

For applying the necessary and uniform pressure to the platen sections in the working runs of the chains, I provide, for both the lower run of the upper chain and the upper run of the lower chain, a plurality of laterally spaced series of free short rollers 50 which in the operation of the machine move in the direction of movement of the platen sections between the platen sections and pressure-resisting tracks. The lower edges of the longitudinally extending plates 45 serve as the pressure tracks for the rollers for the lower run of the upper chain, and the upper edges of the plates 46 serve as the pressure tracks for the rollers for the upper run of the lower chain. Guide plates 51 extend from each side of each of the plates 45 and 46 to hold the rollers against lateral displacement. The plates 45 and 46 are rounded at each end and the guide plates 51 extend about the ends of plates 45 and 46 and along the upper edges of plates 45 and lower edges of plates 46, thus providing endless runways for the rollers of the several series. The plates 45 and 46 are sufficiently shorter than the distance between the shafts 18 and 23 and between the shafts 32 and 37 so that the rollers bear on only those platen sections which have become flattened out in their working runs.

The platen sections are made hollow for the introduction therein of temperature-controlling fluid. The working faces of the platens may be plain flat surfaces adapted to bear against molds or pressure plates received between the co-acting platens of the working runs of the chains, as in Fig. 11, for example, where endless bands, or pressure belts, $a$ and $b$ suitably supported on rolls with their working runs extending between the working runs of the platen chains 10 and 11 serve as pressure bands for receiving between them a continuous strip $c$ of rubber compound or other material to be subjected to pressure and heat for a desired time, or, as it might be, pressure alone. Or, as in the machine illustrated in Figs. 1 to 10, the platen sections may themselves serve as molds, the sections of one or both chains having their working faces formed with mold cavities. In the particular machine shown, mold cavities 52, in this case cavities for forming rubber heels, are formed in the platen sections of the upper chain, a plurality, eight as shown, in each platen section, and the working faces of the platen sections of the lower chain are plain surfaces.

The platen sections are hinged together by hinge pins seated in eye lugs at the outer or back corners of the sections, the axes of the hinge pins being in planes normal to the working face of the sections and passing through the line of the meeting edges of the sections. Each platen section has extending from its outer or back surface four lugs 53, two adjacent each transverse edge, and the edges of these lugs are shaped so that the two lugs at each edge form with the corresponding lugs at the edge of the adjacent platen section recesses to receive and fit the teeth of the sprocket discs as the platen sections turn about the discs. Each platen section has also on its outer face three ribs 54 extending in the direction of movement of the platens and spaced to correspond to the spacing of the longitudinal plates 45 and 46. The edges of these longitudinal ribs, which may be machined or otherwise accurately formed, serve as bearing faces for the pressure rollers. As these ribs extend outwardly beyond the axes of the hinge pins of the platen sections, the ends of the ribs must be bevelled off so as not to interfere with the flexing of the chains as they pass about the sprockets. There will therefore be spaces between the ends of the roller-engaging faces of the ribs of adjacent platen sections as they move in the working runs. To prevent the rollers from dropping into these spaces between the ends of the ribs 54. the rollers 50 are formed with a short axial lug 55 on each side, and the guide plates 51 have narrow inwardly extending flanges 56 which in the normal operating position of the rollers of the series which bear on the platen sections of the upper chain do not engage the axial studs of the rollers, but which serve to support the rollers as they pass over the gaps between the ends of the ribs 54. These flanges desirably extend the whole length of the guide plates 51 of both the plates 45 and the plates 46, serving to hold the rollers in their guideways as they pass through the curved ends of the guideways and to support the rollers in their return runways beneath the plates 46. In order to overcome any possible tendency of the platen sections in the working runs of the chains to move laterally out of exact alignment, the guide plates 51 extend sufficiently to embrace the platen ribs 54, the ribs being of a width to have a close but free moving fit between the outer edge portions of the guide plates.

Power for driving the two platen chains is applied through the sprocket discs 16 and 30 at the front or entrance end of the machine so that the platen sections in the working runs of the chains are pushed through the working pass, thus avoiding any slight separation of the sections which might result from the looseness of their hinge connections if the chains were pulled through the working pass by having the power applied to the sprockets at the discharge end of the machine. As shown, the sprocket shafts 18 and 32 are driven from a vertical worm shaft 60 through gears 61 on the sprocket shafts, the shaft 60 being driven through bevel gears 62 by a drive shaft 63. The shaft 60 is made in two parts having a splined connection as indicated at 64 so as to avoid interference with vertical adjustment of the lower chain-carrying frame and also to permit removal of the upper chain-carrying frame.

Each platen section, as it approaches the beginning of the working run of its chain, is charged with a temperature conditioning fluid, and after each platen section completes its working run and before it reaches the fluid charging point again, fluid is permitted to discharge therefrom. Usually, and in the uses for which the machine is especially intended, that is, for molding and curing articles of rubber compound or other material requiring to be subjected to both pressure and heat, the platen sections are charged with a heating fluid, and while steam might be employed for this purpose, the machine as shown is intended for the use of water or other liquid at a suitable temperature for heating the platen sections. Instead of having each platen section carry its charge during its working run and then discharge its individual charge, the platen sections of each chain are provided with one-way fluid connections between each platen and its next adjacent platen, and the fluid charging and discharging arrangements are such that as each platen section of each chain reaches the discharge position and fluid is permitted to escape therefrom, another platen section of the chain is at the charging position with fluid being forced therein under pressure, the result being that at each charging operation there is a flow of fluid through all the platen sections between the charging place and the discharging place. And in order to reduce cooling of the platens on the return run of the chains, the arrangement is such that the discharge place is close to the charging place, the latter being most desirably just in advance of the beginning of the working run of the chain.

Referring again to the drawings, the platen sections of each chain are connected for fluid flow from each section to the next adjacent section by swivel-connected tubes 70 each controlled by a check valve 71 so that the flow can be in only one direction, that is, in the direction in which the sections move, and these flow connections are alternately at opposite sides of the chain so that the flow in each platen section will be transversely of the length of the chain. Each platen section has at one end an opening 72 in its back wall, which opening is normally closed by a spring-pressed valve plate 73 connected to a short cylindrical plunger 74 having a sliding fit in a cylindrical neck extending outward from the valve seat. A circular casing 75 mounted to turn with the sprocket discs 16 has extending radially therefrom a number of nozzles 76 equal to the number of sprocket teeth and equally spaced circumferentially and angularly positioned between the sprocket teeth. The inner end of each of the plungers 74 of the platen sections of the upper chain is shaped to fit the end of the nozzles 76, both the nozzle ends and the plunger ends being preferably spherically curved as shown, and the nozzles are positioned so that as each platen section comes to seat on the sprockets 16 one of the nozzles will enter its plunger 74 and force it and its valve 73 inward to open the valve.

The opening in the end of each nozzle 76 is normally closed by a valve disc 77 carried by a stem 78 and pressed to closed position by a spring 79. The nozzles are mounted on the outer wall 80 of the casing 75, and from each nozzle a port 81 opens through the wall 80. The nozzle ports 81 are controlled by a stationary valve disc 82 seated against the inner face of wall 80 and which has circumferentially elongated outlet and inlet ports 83 and 84. The valve disc 82 is carried by a hollow hub 85 journaled on the sprocket disc shaft 18 and having a packing gland 86. The inner wall of casing 75 is mounted on and keyed to shaft 18, and its outer wall 80 is journaled on hub 85 and provided with a packing gland 87.

The heating liquid is supplied under pressure from a suitable source through a pipe 90 and swivel joint 91 and passage 92 in shaft 18 to the interior of casing 75, and from the casing chamber the liquid passes through the inlet port 84 to the nozzles successively in register therewith. The discharge from the outlet port 83 is through a passage 95 within a casing 96 on the valve disc 82 to the chamber within hub 85 and discharge pipe 97.

As each platen section turns about the sprocket discs 16 and after its valve 73 has been opened by one of the nozzles 76, the normally closed valve 77 of the nozzle is opened and is then closed again before the platen valve is permitted to close by withdrawal of the nozzle as the platen section takes its working run position. For so opening the nozzle valves, a cam lever 98 is provided for each nozzle pivoted on the outer wall 80 of casing 75 with one arm extending over a disc on the end of the valve stem 78 and a roller on the other arm riding on the periphery of a stationary cam disc 99 mounted on hub 85. The effective cam surface of the disc 99 is concentric with the axis of shaft 18 and is so positioned angularly and is of such length that the valve 77 of each nozzle, after the nozzle has come into valve-opening engagement with the plunger 74 of one of the platen sections, is opened and then maintained open while the nozzle is passing the ports 83 and 84 and is closed before the nozzle starts to withdraw from the platen section with which it has been engaged.

As the platen sections move downward about the sprocket discs 16, their valves 73 being opened, liquid is permitted to flow from each successive platen section during the time that the nozzle in engagement therewith is moving in register with the discharge valve port 83, and at the same time the hot liquid is supplied under pressure to successive platen sections during the time that the nozzles in engagement therewith are moving in register with the inlet valve port 84. There will thus be a constant flow of heating fluid through the chain of platen sections from the section approaching the beginning of the working run of the chain through the sections in the working and return runs of the chain to the section turning down about the sprocket discs 16.

The means for maintaining a flow of heating fluid through the platen sections of the lower chain are the same as those of the upper chain and are marked with the same reference numerals.

The mold cavities 52 of the platen sections of the upper chain are charged with raw material at a suitable point before the sections enter on the working run of the chain. This is accomplished in the machine shown by means of a punch press 100 mounted above the sprocket discs 16. This punch press has a row of punches 101 spaced to register with the transverse rows of mold cavities and are operated to punch out suitable sized pieces of the uncured rubber sheeting 102 which is fed through a slot in the die block 103. The punches are reciprocated by a rock shaft 104 which is operated by a cam wheel 105 on the sprocket shaft 23 acting through a bell crank lever 106 and connecting rod 107 connected to an arm 108 on the rock shaft. The cam is timed so that the punches are operated to punch out pieces of the proper size from the sheet of rubber or other material and deposit the pieces in each row of mold cavities as they pass through the punch press.

As the platen sections of the upper chain with their mold cavities charged with the raw material meet the plain surface of the platen sections of the lower chain as the two come together for the working run of the chains, the material which has been deposited in the mold cavities is pressed into the mold cavities, the excess material spreading out between the meeting surfaces of the platen sections. The material is then subjected to heat and pressure during the travel from the entrance to the discharge end of the working run of the chains, and this will be for a time interval dependent on the speed of movement of the chains and the length of the working run. It may be, for example, 5 minutes for curing rubber heels. At the discharge end of the working run, as the platens move apart, the molded product is stripped off from the platen sections. Any suitable means may be provided for stripping off the product and the molded pieces may be die punched out from the connecting web or flash or otherwise separated therefrom.

For molding or pressing continuous strip material, two endless belts of thin sheet steel or other suitable semi-rigid material are mounted so that their working runs extend between the working runs of the platen chains 10 and 11 as shown in Fig. 11, the platen sections in such case having plain working faces. These pressure belts $a$ and $b$ may each be mounted, for example, on two rollers 110 and 111 and tensioned by a roller 112. Continuous surfaces are thus provided for pressing against the strip material being advanced between them. For holding the belts $a$ and $b$ against lateral displacement, and also for limiting lateral spreading of the material being molded if it is of a somewhat plastic character, the platen sections of one or both chains, preferably both, are provided on their working faces with suitably spaced guide strips 115.

In order to adapt the machine for molding or pressing strip material of different widths, the guide strips 115 are mounted on the platen so that the guide strips of each platen may be adjusted transversely of the length of the chains to space them according to the width of the belts $a$ and $b$ and of the material to be molded. As shown in Figs. 12 and 13, the working face of each platen section has a plurality of rows of two or more pin holes 116, and the guide strips have pins to fit into these holes and the strips may be secured by one or more screws 117 which screw into threaded openings in the platen wall in line with each row of holes 116. The guide strips of each platen section are thus detachably secured to the platen section and are adjustable for varying their spacing. Obviously, more than two guide strips may be attached to each platen section to be spaced for two or more pressure belts in order to adapt the machine for molding at one time two or more strips of material.

If the strip material to be molded or simply pressed is in the form of an endless strip or belt, it must be placed between the pressure belts and removed therefrom by lateral movement. To permit such placing and removal of an endless belt of material, the standards 22 and 27 by which the upper frame structure is supported on one side of the machine are each made of two sections connected by a coupling having a flanged turn sleeve 120 for engaging flanges on opposite sides of the end of each section of the standard, the upper flange of the sleeve being cut away on opposite sides, and a removable spacer 121 being inserted between the coupled ends of the standard, as shown in Figs. 5 and 7. By turning the coupling sleeves 90° and dropping them to the lower sections of the standards and then removing the spacers, the upper frame structure being supported by suitable means, the space between the sections of each of these standards is left open for the replacing or removal of the endless belt of material.

What is claimed is:

1. A continuous press, comprising two endless chains each made up of a plurality of flat rectangular platen sections hingedly connected to meet edge to edge when in a straight run, said chains being mounted and driven one above the other with the lower or working run of the upper chain and the upper or working run of the lower chain moving in the same direction and at the same speed in coacting relation, and pressure means for pressing the coacting platen sections of the working runs of the chains toward each other; the pressure means for each chain comprising a plurality of laterally spaced series of free short rollers free to move in the direction of movement of the platen sections, and endless tracks for said series of rollers providing pressure-resisting runs between which and the platen sections the rollers move and return runs, said tracks being formed by the upper and lower edges of vertically standing and longitudinally extending plates forming part of the frame structure of the machine and shouldered guides extending from said plates for preventing lateral displacement of the rollers and for limiting movement of the rollers from the tracks, the platen sections having longitudinal ribs on their outer face with which said rollers engage and said guides being extended to embrace said ribs.

2. A continuous press, comprising two endless chains each made up of a plurality of flat rectangular hollow platen sections hingedly connected to meet edge to edge when in a straight run, said chains being mounted and driven one above the other with the lower or working run of the upper chain and the upper or working run of the lower chain moving in the same direction and at the same speed in coacting relation; pressure means for pressing the coacting platen sections of the working runs of the chains toward each other, the pressure means for each chain comprising a plurality of laterally spaced series of short rollers free to move in the direction of movement of the platen sections and means providing rigid pressure-resisting tracks for said series of rollers between which and the platen sections the rollers move and guide means for preventing lateral displacement of the rollers; and means for supplying temperature-controlling fluid to each platen section as it approaches its working run and at the same time permitting fluid to escape from a platen section of each chain which has completed its working run, and one-way flow connections between the platen sections of each chain providing for flow of the fluid from the place of fluid supply through the sections in the working run to the place of fluid discharge.

3. A continuous press, comprising two endless chains each made up of a plurality of flat rectangular hollow platen sections hingedly joined together to meet edge to edge when in a straight run, said chains being mounted and driven one above the other with the lower or working run of the upper chain and the upper or working run of the lower chain moving in the same direction and at the same speed in coacting relation, means for pressing the coacting platen sections of the working runs of the chains toward each other, and means for supplying temperature-controlling fluid to each platen section as it approaches its working run and at the same time permitting fluid to escape from a platen section of each chain which has completed its working run.

4. A continuous press, comprising two endless chains each made up of a plurality of flat rectangular hollow platen sections hingedly joined together to meet edge to edge when in a straight run, said chains being mounted and driven one above the other with the lower or working run of the upper chain and the upper or working run of the lower chain moving in the same direction and at the same speed in coacting relation, means for pressing the coacting platen sections of the working runs of the chains toward each other, means for supplying temperature-controlling fluid to each platen section as it approaches its working run and at the same time permitting fluid to escape from a platen section of each chain which has completed its working run, and one-way flow connections between the platen sections of each chain providing for flow of the fluid from the place of fluid supply through the sections in the working run to the place of fluid discharge.

5. A continuous press, comprising two endless chains each made up of a plurality of flat rectangular hollow platen sections hingedly joined together to meet edge to edge when in a straight run, said chains being mounted and driven one above the other with the lower or working run of the upper chain and the upper or working run of the lower chain moving in the same direction and at the same speed in coacting relation, means for pressing the coacting platen sections of the working runs of the chains toward each other, means for supplying heating liquid to each platen section as it approaches its working run and at the same time permitting liquid to escape from a platen section of each chain which has completed its working run, and one-way flow connections between the platen sections of each chain providing for flow of the liquid from the place of liquid supply through the sections in the working run to the place of liquid discharge.

6. In a continuous press, an endless chain made up of a plurality of flat rectangular hollow platen sections hingedly joined together to meet edge to edge when in a straight run, said chain being mounted on spaced rotary members between which the chain extends in a working run and a return run, and means for supplying temperature-controlling fluid to each platen section as it approaches its working run and at the same time permitting fluid to escape from a platen section which has completed its working run.

7. In a continuous press, an endless chain made up of a plurality of flat rectangular hollow platen sections hingedly joined together to meet edge to edge when in a straight run, said chain being mounted on spaced rotary members between which the chain extends in a working run and a return run, means for supplying temperature-controlling fluid to each platen section as it approaches its working run and at the same time permitting fluid to escape from a platen section which has completed its working run, and one-way flow connections between the platen sections providing for flow of the fluid from the place of fluid supply through the sections in the working run to the place of fluid discharge.

8. In a continuous press, an endless chain made up of a plurality of flat rectangular hollow platen sections hingedly joined together to meet edge to edge when in a straight run and each having an opening and a spring-pressed valve by which the opening is normally closed, said chain being mounted on spaced sprocket structures between which the chain extends in a working run and a return run, means for driving one of said sprocket structures, a plurality of radially arranged and angularly spaced nozzles mounted to move with the sprocket structure at the entrance end of the machine one of which nozzles is adapted to make engagement with the opening of each platen section and open the valve of the platen section as the section moves about said sprocket structure, each of said nozzles having a port at its inner end, a stationary valve plate coacting with the ports of said nozzles and having a circumferentially elongated outlet port and a circumferentially elongated inlet port, means for supplying heating liquid under pressure to the inlet port of said plate, and a discharge passage connecting with the outlet port of said plate, whereby heating liquid is supplied to each platen section as it approaches the working run of the chain and liquid is permitted to discharge from each platen section as it approaches the point of liquid supply.

9. In a continuous press, an endless chain made up of a plurality of flat rectangular hollow platen sections hingedly joined together to meet edge to edge when in a straight run and each having an opening and a spring-pressed valve by which the opening is normally closed, said chain being mounted on spaced sprocket structures between which the chain extends in a working run and a return run, means for driving one of said sprocket structures, a plurality of radially arranged and angularly spaced nozzles mounted to move with the sprocket structure at the entrance end of the machine one of which nozzles is adapted to make engagement with the opening of each platen section and open the valve of the platen section as the section moves about said sprocket structure, each of said nozzles having a port at its inner end, a stationary valve plate coacting with the ports of said nozzles and having a circumferentially elongated outlet port and a circumferentially elongated inlet port, means for supplying heating liquid under pressure to the inlet port of said plate, and a discharge passage connecting with the outlet port of said plate, whereby heating liquid is supplied to each platen section as it approaches the working run of the chain and liquid is permitted to discharge from each platen section as it approaches the point of liquid supply, and one-way fluid-flow connections between the platen sections providing for flow of the heating liquid from the place of supply through the working and return runs of the chain to the place of liquid discharge.

10. In a continuous press, an endless chain made up of a plurality of flat rectangular hollow platen sections hingedly joined together to meet edge to edge when in a straight run and each having an opening and a spring-pressed valve by which the opening is normally closed, said chain being mounted on spaced sprocket structures between which the chain extends in a working run and a return run, means for driving one of said sprocket structures, a plurality of radially arranged and angularly spaced nozzles mounted to move with the sprocket structure at the entrance end of the machine one of which nozzles is adapted to make engagement with the opening of each platen section and open the valve of the platen section as the section moves about said sprocket structure, each of said nozzles having a port at its inner end and each having a valve which normally closes its nozzle opening, a stationary valve plate coacting with the ports of said nozzles and having a circumferentially elongated outlet port and a circumferentially elongated inlet port, and cam operated means whereby the valve of each nozzle is opened during the time that its port is in register with the outlet and inlet ports of said plate, means for supplying heating liquid under pressure to the inlet port of said plate, and a discharge passage connecting with the outlet port of said plate, whereby heating liquid is supplied to each platen section as it approaches the working run of the chain and liquid is permitted to discharge from each platen section as it approaches the point of liquid supply, and one-way fluid-flow connections between the platen sections providing for flow of the heating liquid from the place of supply through the working and return runs of the chain to the place of liquid discharge.

11. A continuous press, comprising two endless chains each made up of a plurality of flat rectangular hollow platen sections hingedly connected to meet edge to edge when in a straight run, said chains being mounted and driven one above the other with the lower or working run of the upper chain and the upper or working run of the lower chain moving in the same direction and at the same speed in coacting relation, and the platen sections of one of the chains each having a plurality of mold cavities; pressure means for pressing the coacting platen sections of the working runs of the chains toward each other, the pressure means for each chain comprising a plurality of laterally spaced series of short rollers free to move in the direction of movement of the platen sections and means providing rigid pressure-resisting tracks for said series of rollers between which and the platen sections the rollers move and guide means for preventing lateral displacement of the rollers; and means for supplying heating fluid to each platen section as it approaches its working run and at the same time permitting liquid to escape from a platen section of each chain which has completed its working run, and one-way flow connections between the platen sections of each chain providing for flow of the liquid from the place of liquid supply through the sections in the working run to the place of liquid discharge.

12. A continuous press, comprising two endless chains each made up of a plurality of flat rectangular hollow platen sections hingedly connected to meet edge to edge when in a straight run, said chains being mounted and driven one above the other with the lower or working run of the upper chain and the upper or working run of the lower chain moving in the same direction and at the same speed in coacting relation, and the platen sections of one of the chains each having a plurality of mold cavities; pressure means for pressing the coacting platen sections of the working runs of the chains toward each other, the pressure means for each chain comprising a plurality of laterally spaced series of short rollers free to move in the direction of movement of the platen sections and means providing rigid pressure-resisting tracks for said series of rollers between which and the platen sections the rollers move and guide means for preventing lateral displacement of the rollers; means for supplying heating liquid to each platen section as it approaches its working run and at the same time permitting liquid to escape from a platen section of each chain which has completed its working run, and one-way flow connections between the platen sections of each chain providing for flow of the liquid from the place of liquid supply through the sections in the working run to the place of liquid discharge; and means for filling said mold cavities with raw material at a point in advance of the entrance end of the working runs of the chains.

13. A continuous press, comprising two endless chains each made up of a plurality of flat rectangular hollow platen sections hingedly connected to meet edge to edge when in a straight run, said chains being mounted and driven one above the other with the lower or working run of the upper chain and the upper or working run of the lower chain moving in the same direction and at the same speed in coacting relation, and the platen sections of the upper chain each having a plurality of mold cavities; pressure means for pressing the coacting platen sections of the working runs of the chains toward each other, the pressure means for each chain comprising a plurality of laterally spaced series of short rollers free to move in the direction of movement of the platen sections and means providing rigid pressure-resisting tracks for said series of rollers between which and the platen sections the rollers move and guide means for preventing lateral displacement of the rollers; means for supplying heating liquid to each platen section as it approaches its working run and at the same time permitting liquid to escape from a platen section of each chain which has completed its working run, and one-way flow connections between the platen sections of each chain providing for flow of the liquid from the place of liquid supply through the sections in the working run to the place of liquid discharge; and a punch press for punching blanks from a sheet of material and depositing them in said mold cavities at a point in advance of the entrance end of the working runs of the chains.

14. A continuous press, comprising two endless chains each made up of a plurality of flat rectangular hollow platen sections hingedly connected to meet edge to edge when in a straight run, said chains being mounted and driven one above the other with the lower or working run of the upper chain and the upper or working run of the lower chain moving in the same direction and at the same speed in coacting relation; pressure means for pressing the coacting platen sections of the working runs of the chains toward each other, the pressure means for each chain comprising a plurality of laterally spaced series of short rollers free to move in the direction of movement of the platen sections and means providing rigid pressure-resisting tracks for said series of rollers between which and the platen sections the rollers move and guide means for preventing lateral displacement of the rollers; means for supplying temperature controlling fluid to each platen section as it approaches its working run and at the same time permitting fluid to escape from a platen section of each chain which has completed its working run, and one-way flow connections between the platen sections of each chain providing for flow of the fluid from the place of fluid supply through the sections in the working run to the place of fluid discharge; and two endless pressure belts of semi-rigid material mounted one above the other with the lower or working run of the upper belt and the upper or working run of the lower belt extending in coacting relation between the working runs of the platen chains.

15. A continuous press, comprising two endless chains each made up of a plurality of flat rectangular platen sections hingedly connected to meet edge to edge when in a straight run, said chains being mounted and driven one above the other with the lower or working run of the upper chain and the upper or working run of the lower chain moving in the same direction and at the same speed in coacting relation, pressure means for pressing the coacting platen sections of the working runs of the chains toward each other, and two endless transversely flat pressure belts of semi-rigid material mounted one above the other with the lower or working run of the upper belt and the upper or working run of the lower belt extending in coacting relation between the working runs of the platen chains; the pressure means for each chain comprising a plurality of laterally spaced series of free short rollers free to move in the direction of movement of the platen sections and means providing rigid pressure-resisting tracks for said series of rollers between which and the platen sections the rollers move and guide means for preventing lateral displacement of the rollers, and the platen sections having guides extending from their working faces for holding said belts against lateral displacement.

16. A continuous press, comprising two endless chains each made up of a plurality of flat rectangular platen sections hingedly connected to meet edge to edge when in a straight run, said chains being mounted and driven one above the other with the lower or working run of the upper chain and the upper or working run of the lower chain moving in the same direction and at the same speed in coacting relation, pressure means for pressing the coacting platen sections of the working runs of the chains toward each other, and two endless transversely flat pressure belts of semi-rigid material mounted one above the other with the lower or working run of the upper belt and the upper or working run of the lower belt extending in coacting relation between the working runs of the platen chains; the pressure means for each chain comprising a plurality of laterally spaced series of free short rollers free to move in the direction of movement of the platen sections and means providing rigid pressure-resisting tracks for said series of rollers between which and the platen sections the rollers move and guide means for preventing lateral displacement of the rollers, and the platen sections having guide strips extending in the direction of their movement across their working faces for holding said belts against lateral displacement and for limiting lateral spreading of material being molded.

17. A continuous press as claimed in claim 16, in which the guide strips of the platen sections are adjustably positionable transversely of the length of the chains.

18. A continuous press as claimed in claim 16, in which each platen section has three or more guide strips adjustably positionable transversely of the length of the chains.

19. A continuous press for pressing endless belts, comprising two endless chains each made up of a plurality of flat rectangular platen sections hingedly connected to meet edge to edge when in a straight run, said chains being mounted and driven one above the other with the lower or working run of the upper chain and the upper or working run of the lower chain moving in the same direction and at the same speed in coacting relation, pressure means for pressing the coacting platen sections of the working runs of the chains toward each other, and two endless pressure belts of semi-rigid material mounted one above the other with the lower or working run of the upper belt and the upper or working run of the lower belt extending in coacting relation between the working runs of the platen chains; the pressure means for each chain comprising a plurality of laterally spaced series of short rollers free to move in the direction of movement of the platen sections and means providing rigid pressure-resisting tracks for said series of rollers between which and the platen sections the rollers move and guide means for preventing lateral displacement of the rollers, the supporting structure for the upper platen chain including supporting standards and such standards on one side of the machine comprising spaced sections normally connected by a releasable coupling.

20. A continuous press, comprising two endless chains each made up of a plurality of flat rectangular platen sections hingedly connected to meet edge to edge when in a straight run, said chains being mounted on spaced sprocket structures which support the chains one above the other with the lower or working run of the upper chain and the upper or working run of the lower chain extending parallel in coacting relation; an upper frame structure comprising spaced cross-bars each having a downwardly extending cross plate, a plurality of vertically standing and longitudinally extending plates rigidly connected to said cross-plates with their lower edges below the lower edges of the cross-plates to serve as tracks for pressure rollers bearing against the platen sections in the working run of the upper chain and with their upper edges extending through openings in the cross plates to serve as return tracks for said rollers, and brackets extending from said cross-plates by which shafts of the sprocket structures for the upper chain are carried, a lower frame structure comprising spaced cross-bars each having an upwardly extending cross-plate, a plurality of vertically standing and longitudinally extending plates rigidly connected to said upwardly extending cross-plates with their upper edges above the upper edges of the cross-plates to serve as tracks for pressure rollers bearing against the platen sections in the working run of the lower chain and with their lower edges extending through openings in the cross-plates to serve as return tracks for said rollers; and standards supporting the cross-plates of the upper frame structure, standards supporting the cross-plates of the lower frame structure, and means associated with the standards for one of the frame structures for adjusting the frame structure vertically.

JOHN W. CLERKE.